United States Patent
Liu et al.

(10) Patent No.: US 11,158,315 B2
(45) Date of Patent: Oct. 26, 2021

(54) SECURE SPEECH RECOGNITION (71) Applicant: INTERNATIONAL BUSINESS MACHINES CORPORATION, Armonk, NY (US)

(72) Inventors: Su Liu, Austin, TX (US); Inseok Hwang, Austin, TX (US); Jinho Lee, Austin, TX (US); Matthew Harrison Tong, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 16/533,834

(22) Filed: Aug. 7, 2019

(65) Prior Publication Data
US 2021/0043199 A1 Feb. 11, 2021

(51) Int. Cl.
*G10L 15/22* (2006.01)
*G06F 21/57* (2013.01)

(52) U.S. Cl.
CPC ............ *G10L 15/22* (2013.01); *G06F 21/577* (2013.01); *G10L 2015/223* (2013.01)

(58) Field of Classification Search
USPC ..................................................... 704/1–504
See application file for complete search history.

(56) References Cited

U.S. PATENT DOCUMENTS

| 7,359,528 B2* | 4/2008 | Rhoads .................. G07D 7/004 382/100 |
| 9,031,838 B1 | 5/2015 | Nash et al. |
| 9,769,553 B2 | 9/2017 | Lanman, III et al. |
| 9,886,954 B1* | 2/2018 | Meacham ............. G10L 21/028 |
| 10,749,864 B2* | 8/2020 | Garcia Gomar ........ G10L 17/22 |

(Continued)

FOREIGN PATENT DOCUMENTS

| CN | 108172224 A | 6/2018 |
| CN | 109302659 A | 2/2019 |
| WO | 2017104146 A1 | 6/2017 |

OTHER PUBLICATIONS

Carlini, Nicholas et al. "Hidden Voice Commands", retrieved from Internet: https://www.usenix.org/conference/usenixsecurity16/technical-sessions/presentation/carlini; 25th USENIX Security Symposium; Aug. 10-12, 2016; Austin, TX; 16 pgs.

(Continued)

*Primary Examiner* — Marcus T Riley
(74) *Attorney, Agent, or Firm* — Cantor Colburn LLP; Brian Welle (57) ABSTRACT

Methods, systems and computer program products for operating a secure speech recognition are provided. Aspects include receiving a speech recognition request from a user, the speech recognition request including a captured audio file and filtering the captured audio file to create an in-band audio file and at least one out-of-band audio file. Aspects also include creating an in-band text file based on the in-band audio file and creating an out-of-band text file based on the out-of-band audio file. Aspects further include calculating an attack risk based at least in part on the in-band text file and the out-of-band text file. Based on a determination that the attack risk is below a threshold value, aspects include executing the speech recognition request.

20 Claims, 6 Drawing Sheets

(56) References Cited

U.S. PATENT DOCUMENTS

| | | | | |
|---|---|---|---|---|
| 2007/0274386 | A1* | 11/2007 | Rhoads | G06T 1/0064 |
| | | | | 375/240.12 |
| 2011/0178799 | A1 | 7/2011 | Allen et al. | |
| 2013/0225128 | A1* | 8/2013 | Gomar | H04W 12/06 |
| | | | | 455/411 |
| 2014/0189807 | A1* | 7/2014 | Cahill | H04L 63/0861 |
| | | | | 726/4 |
| 2015/0326571 | A1* | 11/2015 | Gomar | H04L 63/0861 |
| | | | | 726/6 |
| 2017/0180391 | A1* | 6/2017 | Hinchliffe | H04L 63/08 |
| 2018/0152446 | A1* | 5/2018 | Gomar | G10L 17/00 |
| 2021/0043199 | A1* | 2/2021 | Liu | G06F 21/32 |

OTHER PUBLICATIONS

Coldewey, Devin "Hackers send silent commands to speech recognition systems with ultrasound", @techcrunch; approx 2 yrs ago; 2017; retrieved https://techcrunch.com/2017/09/06/hackers-send-silentcommands-to-speech-recognition-systems-with-ultrasound/; 8 pgs.

Mavroudis, et al. "The Good, the Bad, and the Ugly of the Ultrasonic Communications Ecosystem", RSA Conference2018; Apr. 16-20, 2018; https://published-prd.lanyonevents.com/published/rsaus18/sessionsFiles/8676/MBS-T07-The-Good-the-Bad-and-the-Ugly-of-the-Ultrasonic-Communications-Ecosystem.pdf; 46 pgs.

Neal, Dave "DolphinAttack: Alexa, Siri and more are vulnerable to 'silent' hacking", Sep. 7, 2017; retrieved at https://www.theinquirer.net/inquirer/news/3016855/dolphinattack-alexa-siri-and-more-vulnerable-to-silent-hacking; 3 pgs.

Ohio State University "Audio Filters"; Undated; downloiaded Aug. 2, 2019; retrieved http://www2.ece.ohiostate.edu/anderson/Outreachfiles/AudioEqualizerPresentation.pdf; 57 pgs.

Roy, Nirupam et al. "BackDoor: Making Microphones Hear Inaudible Sounds", MobiSys '17, Jun. 19-23, 2017, Niagara Falls, NY, USA; retrieved from https://synrg.csl.illinois.edu/papers/backdoor_mobisys17.pdf; 13 pgs.

Shaikh, Faizan "Getting Started with Audio Data Analysis using Deep Learning (with case study)" Analyticsvidhya.com; dated Aug. 24, 2017; https://www.analyticsvidhya.com/blog/2017/08/audio-voiceprocessing-deeplearning/; 35 pgs.

Techcrunch.com "Hackers send silent commands to speech recognition systems with ultrasound", Sep. 8, 2017; retrieved at https://news.ycombinator.com/item?id=15199233; 11 pgs.

Zhang, et al. "DolphinAttack: Inaudible Voice Commands", 2017 Association for Computing Machinery; CCS '17, Oct. 30-Nov 3, 2017; retrieved https://www.theinquirer.net/inquirer/news/3016855/dolphinattack-alexa-siri-and-more-vulnerable-to-silent-hacking; 15 pgs.

Zhang, Nan et al. "Understanding and Mitigating the Security Risks of Voice-Controlled Third Party Skills on Amazon Alexa and Google Home"; arXiv.org, arXiv:1805.01525v2, Jun. 29, 2018; 16 pgs.

* cited by examiner

SECURE SPEECH RECOGNITION

BACKGROUND

The invention relates generally to secure speech recognition systems and, more specifically, to secure speech recognition systems configured to prevent unauthorized control of connected devices.

Speech recognition systems are becoming ubiquitous and are currently used to recognize and convert voice control commands to control a wide variety of human interactive devices, such as televisions, personal assistants, home network devices, thermostats, entertainment systems, security systems, and the like. Such speech recognition based systems monitor the audio for a voice command and responsively perform an action indicated by the voice command or provide information to users in response to the voice commands. In most cases, the voice commands need to be recognized and converted to computer readable instructions by the speech recognition systems.

SUMMARY

According to an embodiment, a secure speech recognition system is provided. The system includes a memory having computer readable computer instructions, and a processor for executing the computer readable instructions. The computer readable instructions include instructions for receiving a speech recognition request from a user, the speech recognition request including a captured audio file and filtering the captured audio file to create an in-band audio file and at least one out-of-band audio file. The computer readable instructions also include instructions for creating an in-band text file based on the in-band audio file and creating an out-of-band text file based on the out-of-band audio file. The computer readable instructions further include instructions for calculating an attack risk based at least in part on the in-band text file and the out-of-band text file. Based on a determination that the attack risk is below a threshold value, the computer readable instructions include instructions for executing the speech recognition request.

According to another embodiment, a method for operating a secure speech recognition system is provided. The method includes receiving a speech recognition request from a user, the speech recognition request including a captured audio file and filtering the captured audio file to create an in-band audio file and at least one out-of-band audio file. The method also includes creating an in-band text file based on the in-band audio file and creating an out-of-band text file based on the out-of-band audio file. The method further includes calculating an attack risk based at least in part on the in-band text file and the out-of-band text file. Based on a determination that the attack risk is below a threshold value, the method includes executing the speech recognition request.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes receiving a speech recognition request from a user, the speech recognition request including a captured audio file and filtering the captured audio file to create an in-band audio file and at least one out-of-band audio file. The method also includes creating an in-band text file based on the in-band audio file and creating an out-of-band text file based on the out-of-band audio file. The method further includes calculating an attack risk based at least in part on the in-band text file and the out-of-band text file. Based on a determination that the attack risk is below a threshold value, the method includes executing the speech recognition request.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
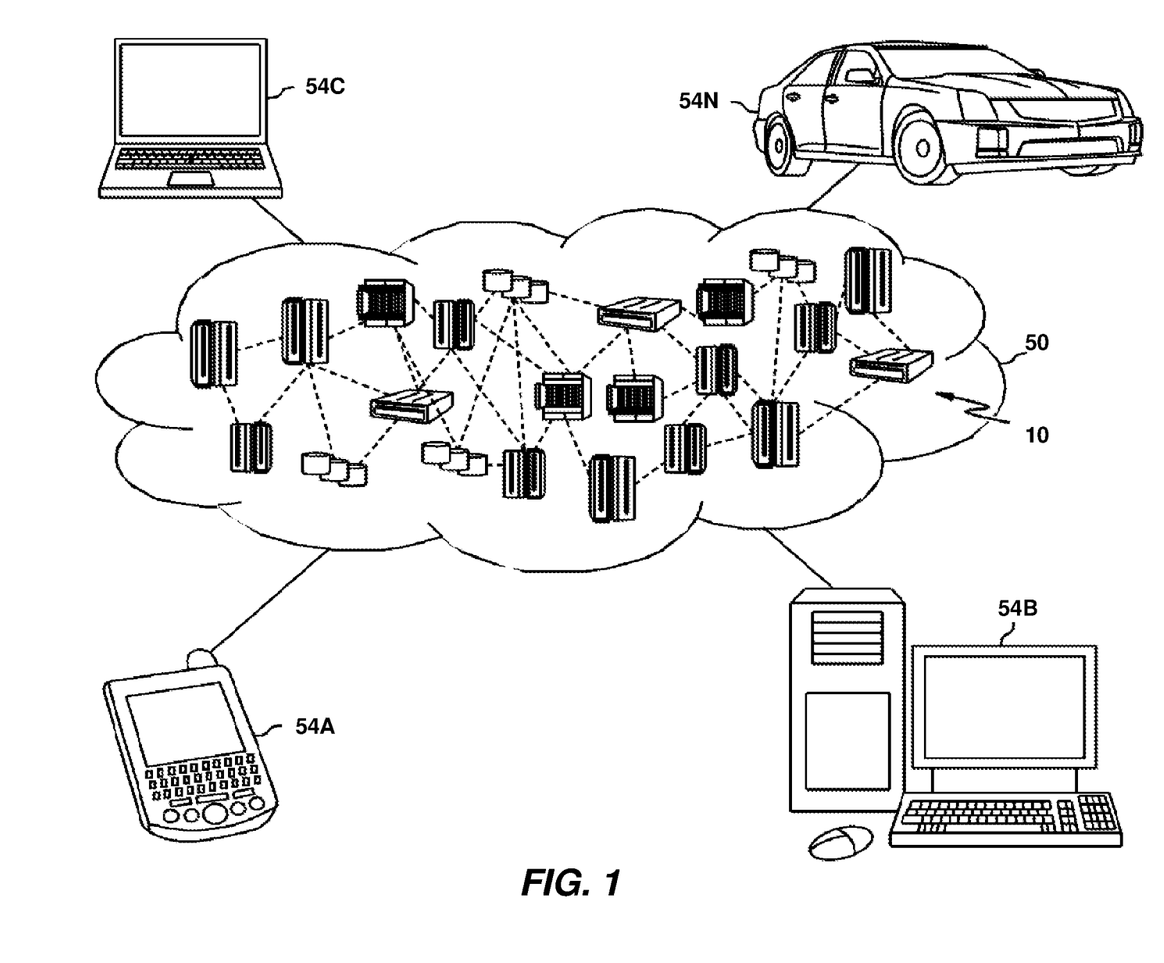
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
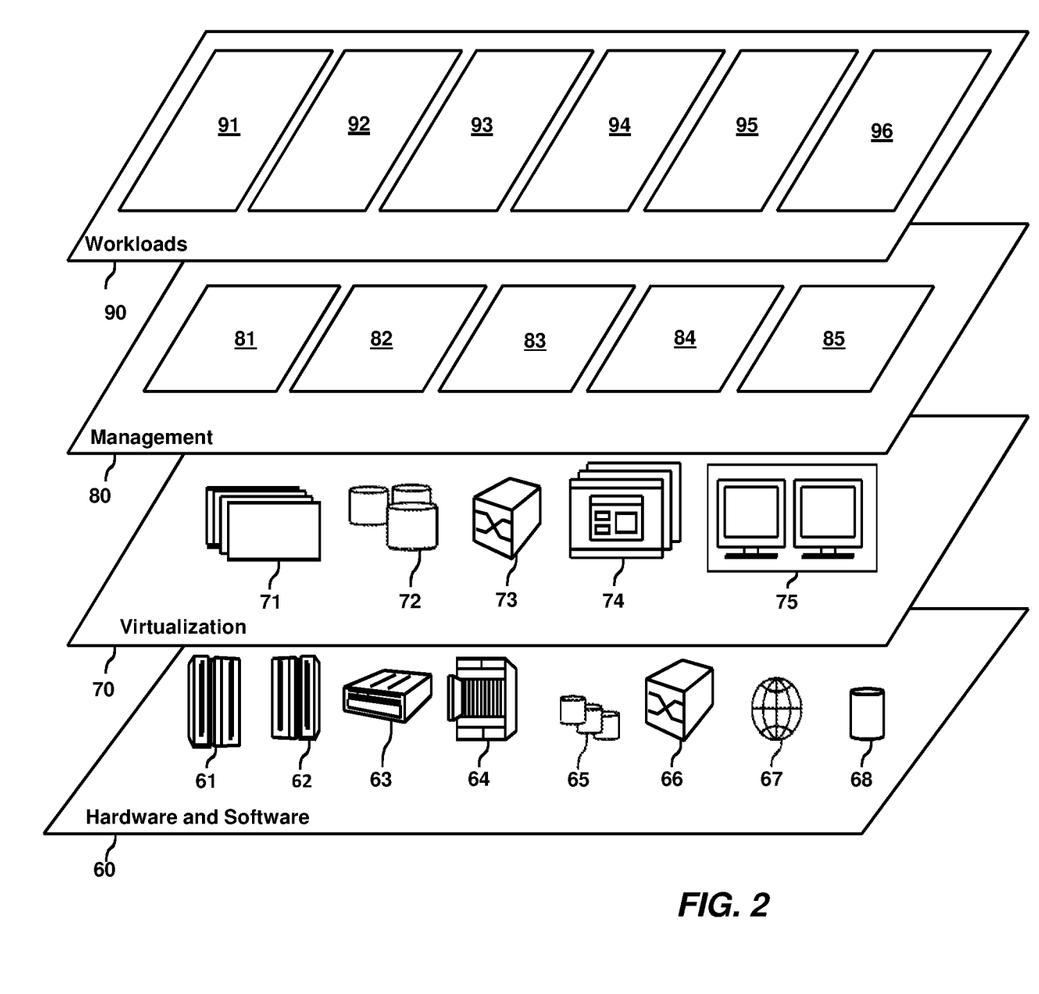
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operating a secure speech recognition system 96.

Figure 3:
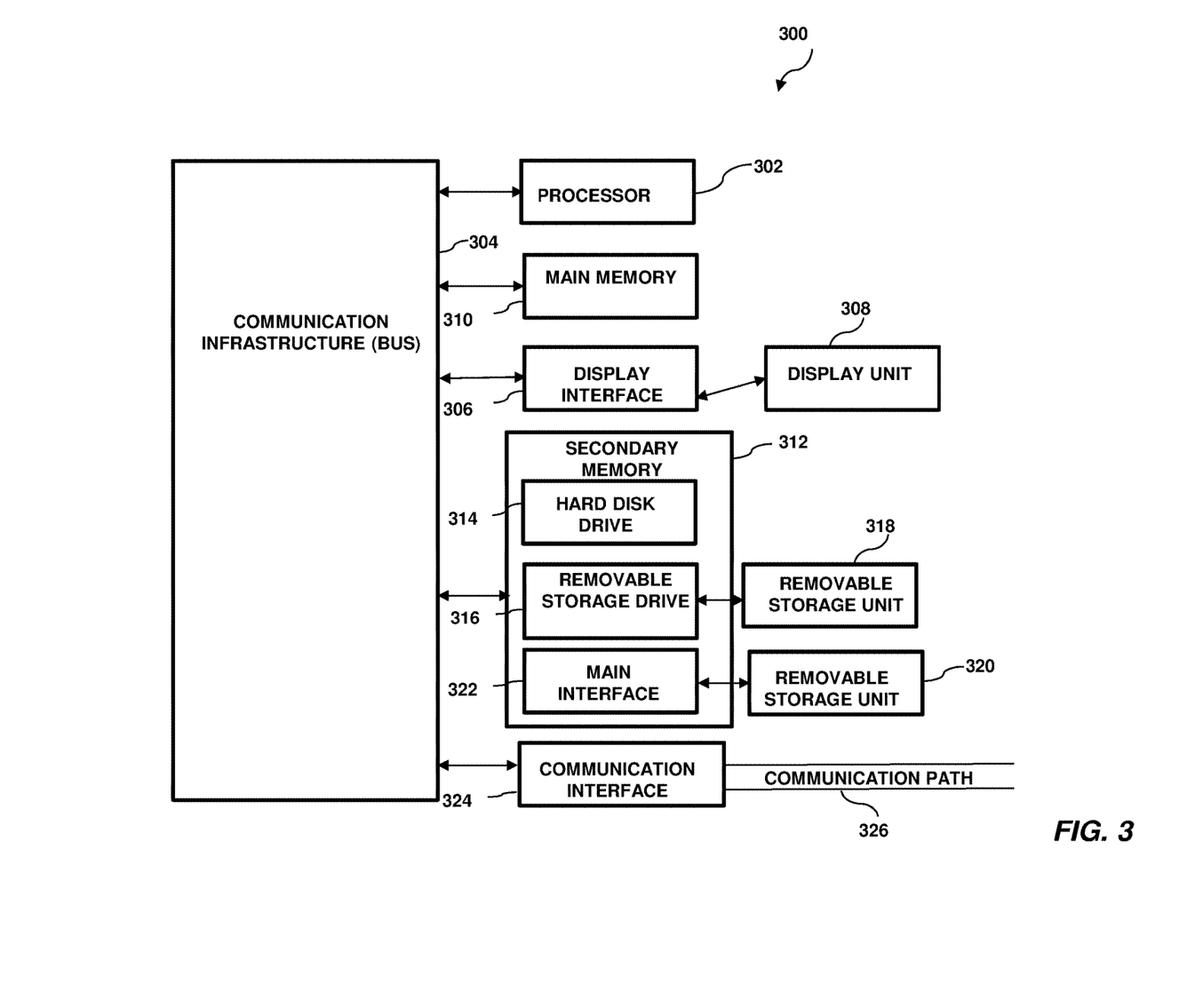
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Recently, malicious software has been developed that attempts to control a speech recognition based system by providing commands through a speech recognition system that are not audible to humans, and thus not detected by users. In exemplary embodiments, a system for operating a speech recognition system that is configured to prevent such attack is provided. In exemplary embodiments, a secure speech recognition system detects such attacks by filtering received voice commands by frequency to identify commands that were not likely made by a human user.

Figure 4:
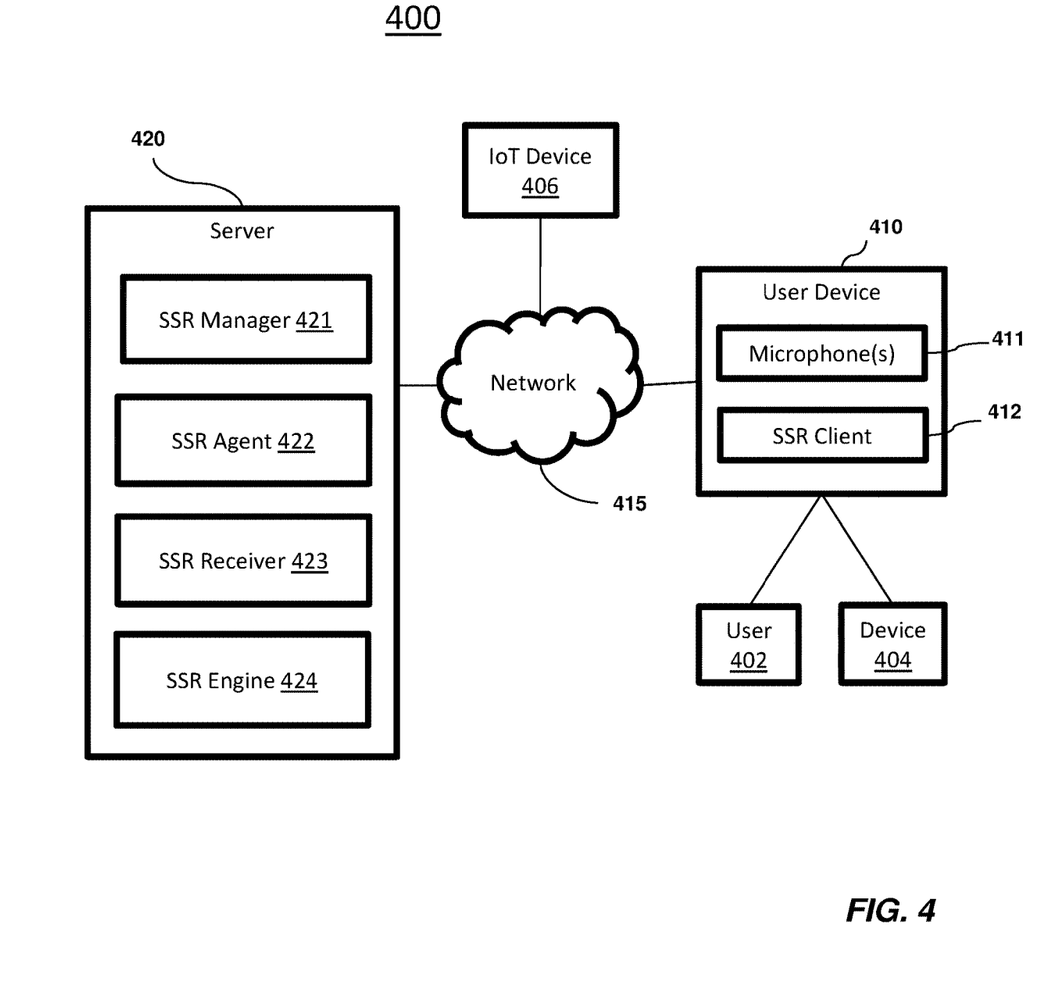
FIG. 4 depicts a system upon which operating a secure speech recognition system may be implemented according to one or more embodiments of the present invention.

Turning now to FIG. 4, a secure speech recognition system 400 in accordance with an embodiment is shown. The secure speech recognition system 400 shown in FIG. 4 includes a server 420 in communication with a user device 410 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The user device 410 is configured to receive speech recognition commands, also referred to as voice commands, from a user 402 in range of the user device 410. The user device 410 can be a smartphone, smartwatch or another personal electronic device that is associated with a user. In exemplary embodiments, one or more internet of things (IoT) devices 406 are in communication with user device 410 via the communications network 415. The IoT devices 406 can be any suitable IoT device such as a camera, a smart lock, a garage door opener, a security system, a thermostat, a light bulb or the like. In exemplary embodiments, the user 402 provides voice commands to the user device 410 to control the operation of the IoT device 406.

In exemplary embodiments, the user device 410 can be a smartphone, a tablet, a computer system such as the one shown in FIG. 3, a smart speaker, a television, or any other suitable electronic device. The user device 410 includes a microphone 411 and secure speech recognition (SSR) client 412. In one embodiment, the microphone 421 is used to capture voice commands and to provide the captured audio signals to the SSR client 412. In exemplary embodiments, a device 404 is within range of the user device 410 and provides commands to the user device 410. In one embodiment, the commands provided by the device 404 are inaudible to humans, i.e., they have a frequency that is outside of the range that humans can hear. In exemplary embodiments, the device 404 is a smartphone, a tablet, a computer system such as the one shown in FIG. 3, a smart speaker, a television, or any other suitable electronic device. In one embodiment, the device 404 is configured to capture voice commands provided by the user 402 to the user device 410 and to selectively provide commands to the user device. For example, the user device 410 may capture and store a command to lock a door or activate a security system. The device 404 may then create and transmit a command to unlock the door or deactivate the security system in a manner that is not detected by the user 402.

In exemplary embodiments, the secure speech recognition server 420 includes a secure speech recognition (SSR) manager 421, an SSR agent 422, an SSR receiver 423, and an SSR engine 424. The SSR manager 421 is a user interface for configuring and managing the SSR system 400. In one embodiment, the SSR manager 421 is used to create and modify an SSR data structure, an SSR profile, user profiles, and personalized SSR criteria that are utilized by the server 420. In one embodiment, the SSR profile is a configuration file for defining SSR service scope according to types of audio inputs (e.g., only checking commands for unlocking a door, etc.) and related settings. For example, service types, user types, device types, application types, network settings, port and connecting settings of connected repositories, and the like. The user profile is a personal SSR configuration file for defining SSR service levels (user, device, application, and content levels) and aspects (e.g. request types: voice input, record keeping, human-device interaction, and the like) and related settings. For example, if a service level is in a user level (such as simple voice input method for inputing a short message), then any user's inputs will not be filtered (pass through) with out and filtering operation (without performance overhead); If a service level is IoT (smart locker) device based, then only the IoT related command will be passband only (lowpass-filtered and highpass-filtered).

In exemplary embodiments, the SSR criteria is a set of rules for defining personalized SSR criteria for setting security level and computing the risk score for each submitted command. In exemplary embodiments, the server 420 and the user device 410 are configured to use an SSR data structure to communicate data needed for performing the SSR. The SSR data structure is a data structure that is used for tracking the users' speech recognition requests and correlated contexts (questions, inputs, operation commands, and the like) in daily service. In one embodiment, the SSR data structure includes a UserID, a DeviceID, IoTID, a SecurityLevel of the IOTID, CapturedAudio, ConvertedText, LowPassText, HighPassText, BandPassText, RequestType, RiskScore.

In exemplary embodiments, the SSR agent 422 is a module configured to collect user personal characteristics and user SSR service preferences. The SSR Agent 422 allows a user to register their voice and the SSR system to operate based on their voice. For example, the SSR agent 422 can analyze the voice of a user and identify the frequency range of their voice as being from 85 Hz to 180 Hz. The SSR agent 422 includes an SSR learner that is a module configured to learn personal sound characteristics and user-customized SSR settings on certain devices, applications, and requests. The SSR agent 421 also includes an SSR repository, which is a database for saving and managing the registered normal user's voice signals. In exemplary embodiments, the SSR agent 421 also includes an SSR categorizer, which is a module that is configured to categorize the learned personal preference patterns into different security categories. The security categories are a set of security level groups for users, devices, application, and input contents. The SSR agent 422 is configured to create and store SSR processing patterns based on observed user behavior. The SSR processing patterns are a collection of SSR processing options for different SSR categories. For example, based on the security level of the user, device, application, and input contents, one of the following security options can be selected: Pass-through; Pass-through with Alert; Lowpass; Lowpass with Alert; Highpass; Highpass with Alert; Block; Block with Alert; and the like.

In exemplary embodiments, the SSR receiver 423 is a module configured to receive a speech recognition request embedded with the SSR data structure from the user device 410. The SSR receiver 423 parses and extracts context information from the SSR data structure. The SSR receiver 423 includes an SSR Parameter identifier, which is a module configured to identify the parameters from the received data, such as user identification, device identification, application, purpose, and the like. The SSR receiver 423 also includes an SSR signal analyzer, which is a module configured to analyze the received audio signal by, for example, comparing the received audio signal with the registered user voice. If a registered voice frequency of a first user is from 85 to 180 Hz, but the frequency of a received audio from the user is from 200 to 250 Hz, this difference may indicate attempted unauthorized access. The SSR receiver 423 also includes an SSR filter, which is a module configured to filter the audio into one or more of low passed signals, high passed signals, or/and passband signals. For example, for a given user the low passed signal is the signals with a frequency of less than or equal to 85 HZ, the passband signal is the signals with a frequency of between 85 HZ and 185 HZ, and the high passed signal is the signals with a frequency of greater than 186 HZ.

In exemplary embodiments, the SSR engine 424 is a module that is configured to extract text from the filtered audio signals and to analyze the extracted text to create a risk score. The SSR engine 424 includes an SSR risk estimator, which is a module configured to calculate a risk score according to the security level of the user, mobile device, communicated IoT device, input content, and the like. For example, message types "Hello" and "lock front door" may have different security levels in different request contexts (short message vs. IoT command). For each received request (Request ID), the correlated User ID, Device ID, App ID, IoT Device ID, and Request Type (normal message, IoT command) may have different predefined or learned security level. The correlated "Risk Score" will be calculated differently. The SSR engine 424 also includes an SSR text selector, which is a module that is configured to select filtered text string according to the estimated risks. In addition, the SSR engine 424 includes an SSR output module, which is configured to update the SSR data structure and returning the SSR data structure to the SSR client 412.

In exemplary embodiments, the user device 410 includes an SSR client 412 that is configured to receive audio from the microphone 411 and to communicate with the server 420. The SSR client 412 includes a voice capture module that is configured to create an SSR data structure with the captured audio and other data that is avail to the user device 410. The SSR client 412 includes an SSR requester that is configured to communicate with the SSR receiver 423. The SSR client 412 also includes a text receiver that is configured to receive the SSR output with SSR data and an SSR alert module that is configured to alert the user 402 as needed. In addition, the SSR client 412 includes an SSR controller that is configured to selectively execute the recognized text commands on the IoT device 406 based on the SSR data.

Figure 5:
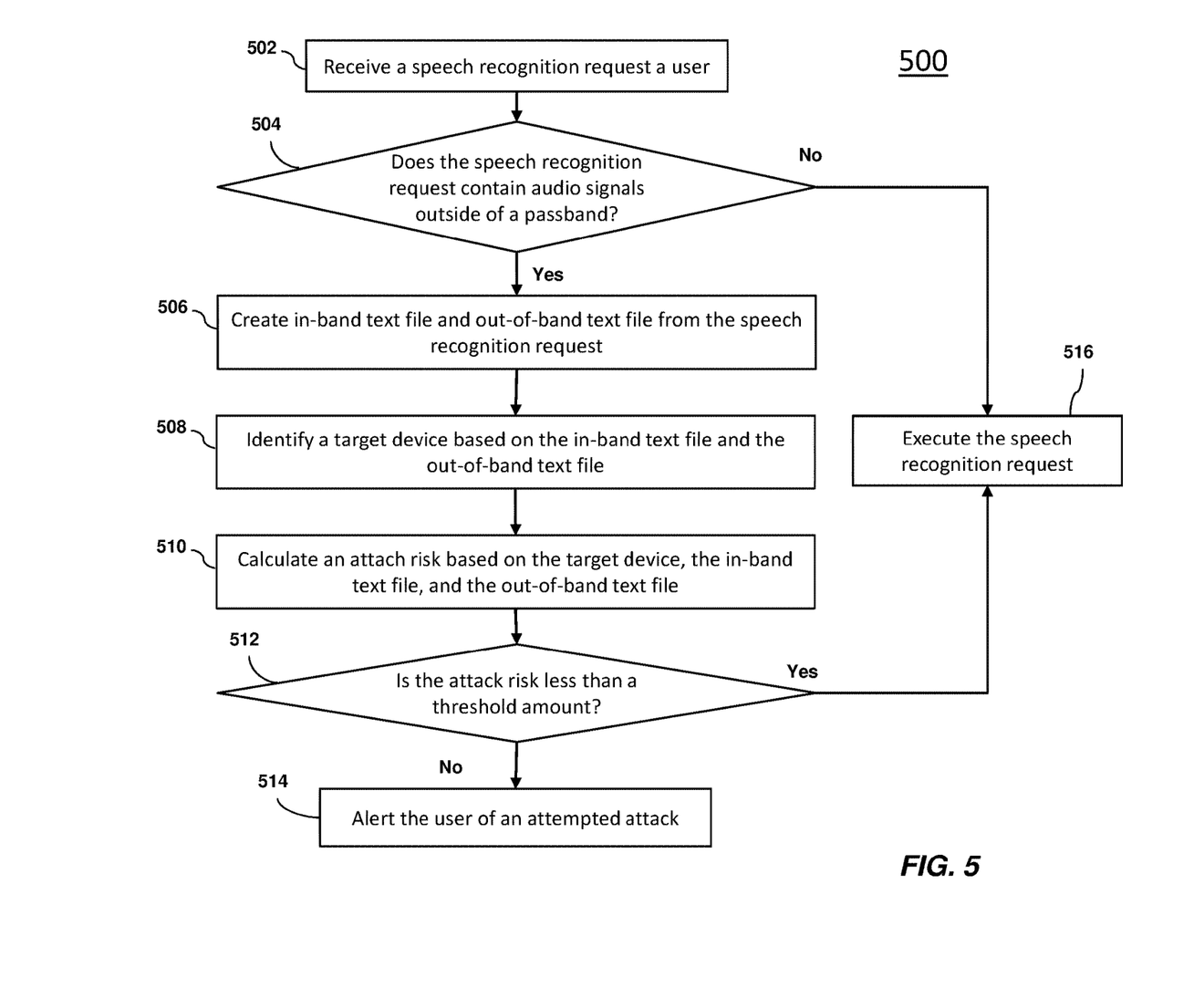
FIG. 5 depicts a flow diagram of a method for operating a secure speech recognition system according to one or more embodiments of the present invention.

Turning now to FIG. 5, a flow diagram of a method 500 for operating a secure speech recognition system in accordance with an embodiment is shown. The method 500 begins at block 502 and receives a speech recognition request a user. Next, as shown at decision block, the method 500 includes determining if the speech recognition request contains audio signals outside of a passband. In exemplary embodiments, the passband is a frequency range defined by a low-frequency cutoff value and a high-frequency cutoff value. In one embodiment, the low-frequency cutoff value and a high-frequency cutoff value can be default values that are set to traditional values at the limits of human hearing, i.e., 20 Hz to 20 kHz. In another embodiment, the low-frequency cutoff value and a high-frequency cutoff value can be default values that are set to user-specific values that capture the range of the frequency of a user's voice. If the speech recognition request does not contain audio signals outside of the passband, the method 500 proceeds to block 516 and executes the speech recognition request.

If the speech recognition request contains audio signals outside of the passband, the method 500 proceeds to block 506 and creates an in-band text file and out-of-band text file from the speech recognition request. In exemplary embodiments, creating the text files is performed using any of a variety of known speech-to-text conversion methods. Next, as shown at block 508, the method includes identifying a target device based on the in-band text file and the out-of-band text file. The target device is a device that the speech recognition request is attempting to control or access. The method 500 also includes calculating an attach risk based on the target device, the in-band text file, and the out-of-band text file, as shown at block 510. In exemplary embodiments, the attack risk is determined based on thresholds and preferences in a user profile of the user, which have been previously provided by the user.

As shown at decision block 512, the method 500 includes determining whether the attack risk less than a threshold amount. If the attack risk less than a threshold amount, the method 500 proceeds to block 516 and executes the speech recognition request. Otherwise, the method 500 proceeds to block 514 and alerts the user of an attempted attack. In exemplary embodiments, alerting the user includes providing the user with the out-of-band text file and optionally presenting the user with the calculated attack risk.

Figure 6:
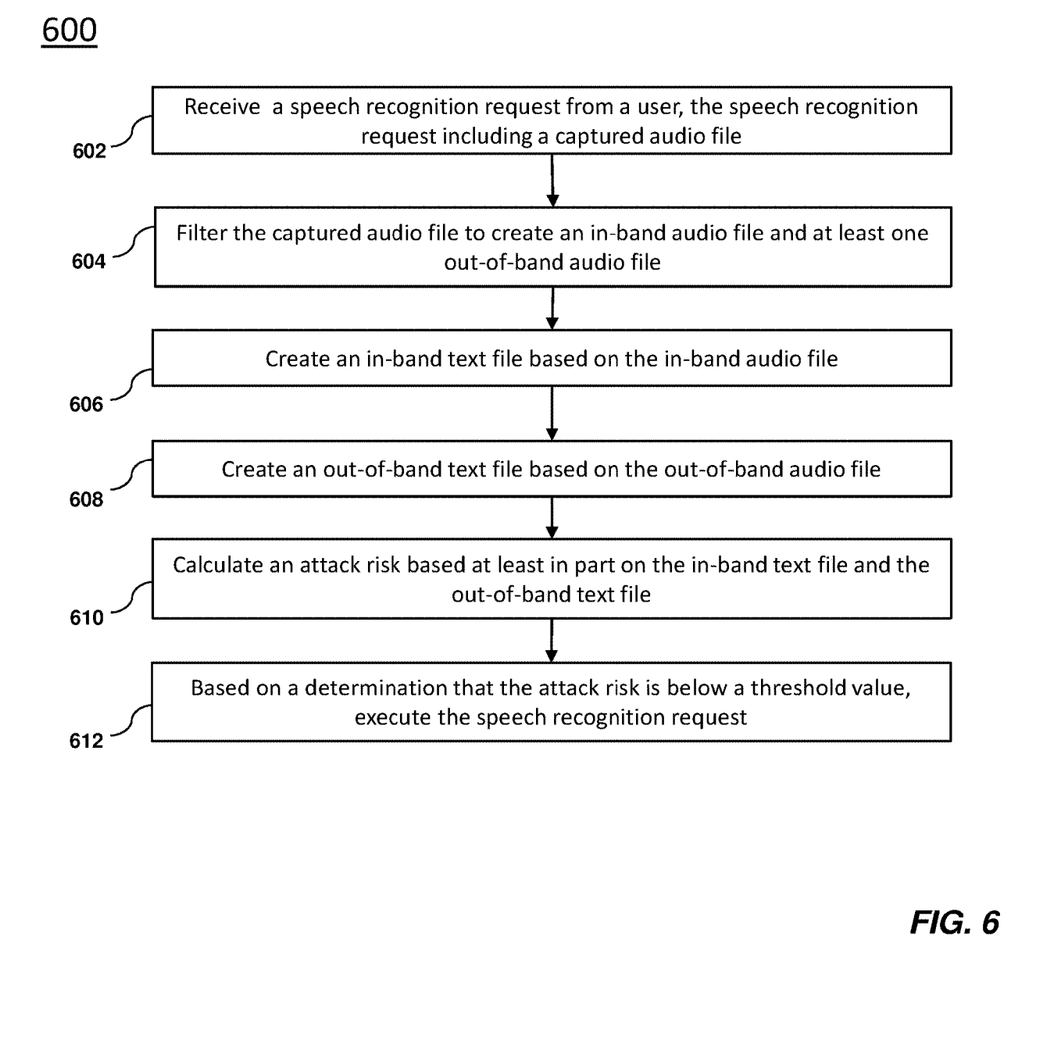
FIG. 6 depicts a flow diagram of another method for operating a secure speech recognition system according to one or more embodiments of the present invention.

Turning now to FIG. 6, a flow diagram of another method 600 for operating a secure speech recognition system in accordance with an embodiment is shown. As shown at block 602, the method 600 includes receiving a speech recognition request from a user, the speech recognition request including a captured audio file. In exemplary embodiments, the speech recognition request further includes an identification of a device that captured the captured audio file. Next, as shown at block 604, the method 600 includes filtering the captured audio file to create an in-band audio file and at least one out-of-band audio file. In exemplary embodiments, the in-band audio file is the portion of the captured audio file that is within a frequency range defined by a low-frequency cutoff value and a high-frequency cutoff value. Similarly, the one out-of-band audio file is the portion of the captured audio file that is outside a frequency range defined by a low-frequency cutoff value and a high-frequency cutoff value. In one embodiment, the out-of-band audio file includes a low-frequency audio file and high-frequency audio file.

In exemplary embodiments, the method includes determining an identity of the user and obtaining a user profile for the user. In one embodiment, the identity of the user is determined based at least in part on performing a voice recognition algorithm on the captured audio file. In another embodiment, the identity of the user is determined based at least in part on a device identification of the device that captured the captured audio file. In exemplary embodiments, the user profile includes a low-frequency cutoff value and a high-frequency cutoff value for the user.

The method 600 also includes creating an in-band text file based on the in-band audio file, as shown at block 606, and creating an out-of-band text file based on the out-of-band audio file, as shown at block 608. In exemplary embodiments, creating the text files is performed using any of a variety of known speech-to-text conversion methods. Next, as shown at block 610, the method 600 includes calculating an attack risk based at least in part on the in-band text file and the out-of-band text file. Based on a determination that the attack risk is below a threshold value, the method 600 includes executing the speech recognition request, as shown at block 612.

In exemplary embodiments, the attack risk is calculated based on a security level associated with the IoT device that is the voice command is intended to control and based on a security level associated with an action that the voice command includes. For example, the security level of the device can range from 1-10 (1 being the lowest to 10 being the highest) where IoT devices such as smart lights have a level of 1 and IoT devices such as home security systems or smart locks have a level of 10. Likewise, each command has an associated security level that can range from 1-10 (1 being the lowest to 10 being the highest). For example, a command to activate or deactivate a home security system can have a score of 10 while a command to change the channel of a smart television can have a score of 1. In one embodiment, the attack risk can be calculated by multiplying the security level associated with the IoT device with the security level of the action of the voice command action.

Technical benefits include an improved functionality of speech recognition systems that are able to identify speech recognition requests that include audio that is outside of a predetermined frequency range and to alert the user upon detecting attempted malicious activity. By filtering speech recognition requests based on their frequency, the security of the speech recognition is increased by reducing the vulnerability of the speech recognition system to hacking attempts.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a secure speech recognition system, comprising:
    receiving a speech recognition request from a user, the speech recognition request including a captured audio file;
    filtering the captured audio file to create an in-band audio file and at least one out-of-band audio file;
    creating an in-band text file based on the in-band audio file;
    creating an out-of-band text file based on the out-of-band audio file;
    calculating an attack risk based at least in part on the in-band text file and the out-of-band text file; and
    based on a determination that the attack risk is below a threshold value, executing the speech recognition request.

2. The method of claim 1, further comprising alerting the user of an attempted attack based on a determination that the attack risk is above the threshold value.

3. The method of claim 1, wherein alerting the user includes providing the user with the out-of-band text file.

4. The method of claim 1, further comprising determining an identity of the user and obtaining a user profile for the user.

5. The method of claim 4, wherein the identity of the user is determined based at least in part on performing a voice recognition algorithm on the captured audio file.

6. The method of claim 4, wherein the user profile includes a low-frequency cutoff value and a high-frequency cutoff value for the user and wherein filtering the captured audio file includes applying a band pass filter using the low-frequency cutoff value and the high-frequency cutoff value to the captured audio file.

7. The method of claim 1, wherein the speech recognition request further includes an identification of a device that captured the captured audio file.

8. The method of claim 1, further comprising identifying a target device and a command for the target device based on the in-band text file and the out-of-band text file.

9. The method of claim 8, wherein the attack risk is calculated at least in part based on a security level of the target device.

10. The method of claim 9, wherein the security level of the target device is obtained from a user profile of the user.

11. A system for operating a secure speech recognition system, comprising:
    a memory having computer readable instructions; and
    a processor for executing the computer readable instructions, the computer readable instructions including instructions for:
        receiving a speech recognition request from a user, the speech recognition request including a captured audio file;
        filtering the captured audio file to create an in-band audio file and at least one out-of-band audio file;
        creating an in-band text file based on the in-band audio file;
        creating an out-of-band text file based on the out-of-band audio file;
        calculating an attack risk based at least in part on the in-band text file and the out-of-band text file; and
        based on a determination that the attack risk is below a threshold value, executing the speech recognition request.

12. The system of claim 11, wherein the computer readable instructions further include instructions for alerting the user of an attempted attack based on a determination that the attack risk is above the threshold value.

13. The system of claim 11, wherein alerting the user includes providing the user with the out-of-band text file.

14. The system of claim 11, wherein the computer readable instructions further include instructions for determining an identity of the user and obtaining a user profile for the user.

15. The system of claim 14, wherein the identity of the user is determined based at least in part on performing a voice recognition algorithm on the captured audio file.

16. The system of claim 14, wherein the user profile includes a low-frequency cutoff value and a high-frequency cutoff value for the user and wherein filtering the captured audio file includes applying a band pass filter using the low-frequency cutoff value and the high-frequency cutoff value to the captured audio file.

17. The system of claim 11, wherein the speech recognition request further includes an identification of a device that captured the captured audio file.

18. The system of claim 11, wherein the computer readable instructions further include instructions for identifying a target device and a command for the target device based on the in-band text file and the out-of-band text file.

19. The system, of claim 18, wherein the attack risk is calculated at least in part based on a security level of the target device.

20. A computer program product comprising a computer readable storage medium having program instructions embodied therewith the program instructions executable by a computer processor to cause the computer processor to perform a method, comprising:
- receiving a speech recognition request from a user, the speech recognition request including a captured audio file;
- filtering the captured audio file to create an in-band audio file and at least one out-of-band audio file;
- creating an in-band text file based on the in-band audio file;
- creating an out-of-band text file based on the out-of-band audio file;
- calculating an attack risk based at least in part on the in-band text file and the out-of-band text file; and
- based on a determination that the attack risk is below a threshold value, executing the speech recognition request.

\* \* \* \* \*